US012785746B2

(12) United States Patent
Deng

(10) Patent No.: US 12,785,746 B2
(45) Date of Patent: Nov. 3, 2026

(54) PROTECTIVE CASE FOR MOBILE TERMINAL

(71) Applicant: GUANGDONG XIZHONGXI TECHNOLOGY CO., LTD., Dongguan (CN)

(72) Inventor: Xiuhong Deng, Shaoyang (CN)

(73) Assignee: GUANGDONG XIZHONGXI TECHNOLOGY CO., LTD., Dongguan (CN)

( * ) Notice: Subject to any disclaimer, the term of this patent is extended or adjusted under 35 U.S.C. 154(b) by 305 days.

(21) Appl. No.: 18/333,560

(22) Filed: Jun. 13, 2023

(65) Prior Publication Data

US 2024/0396582 A1 Nov. 28, 2024

(30) Foreign Application Priority Data

May 23, 2023 (CN) ......................... 202321252169.7

(51) Int. Cl.
*H04B 1/3888* (2015.01)

(52) U.S. Cl.
CPC .................................. *H04B 1/3888* (2013.01)

(58) Field of Classification Search
CPC ...................... H04B 1/3888; H04B 2001/3894
See application file for complete search history.

(56) References Cited

U.S. PATENT DOCUMENTS

| | | | | |
|---|---|---|---|---|
| 2003/0052126 A1* | 3/2003 | Zettle | B65D 43/0212 | 220/714 |
| 2013/0193006 A1* | 8/2013 | Bergreen | A45C 11/22 | 206/37 |
| 2013/0273944 A1* | 10/2013 | Wilson | H04M 1/026 | 455/457 |
| 2015/0038200 A1* | 2/2015 | Kennard | H04B 1/3888 | 455/575.8 |

* cited by examiner

*Primary Examiner* — David Tung

(57) ABSTRACT

A protective case for a mobile terminal includes a lower shell, an upper cover detachably connected to the lower shell, and a waterproof plug. The upper cover and the lower shell are enclosed to form an accommodating cavity. A microphone through hole and a groove are defined on a sidewall of the upper cover. The microphone through hole and the groove are spaced apart. The microphone through hole is communicated with the accommodating cavity. The waterproof plug is rotatably connected to the upper cover. The waterproof plug is assembled in the microphone through hole or the groove by rotating the waterproof plug, and the waterproof plug is separated from the microphone through hole or the groove by rotating the waterproof plug. The protective case solves a technical problem that a conventional protective case has a microphone waterproof function is likely to cause echo or low sound.

7 Claims, 8 Drawing Sheets

PROTECTIVE CASE FOR MOBILE TERMINAL

TECHNICAL FIELD

The present disclosure relates to a technical field of external accessories of mobile terminals, and in particular to a protective case for a mobile terminal.

BACKGROUND

With rapid development of mobile Internet, mobile terminals become necessary daily necessities in people's daily life. People use the mobile terminals to shop online, chat, play games, etc. The mobile terminals generally need protection during use. Therefore, protective cases are created.

In order to meet waterproof requirements of a microphone of a mobile terminal, a through hole is generally defined on a position of a conventional protective case corresponding to the microphone, and a waterproof and breathable film is attached to the through hole, so that the microphone is waterproof while receiving sound. However, in research and practice of the prior art, the inventor of the present disclosure found that the waterproof and breathable film is likely to cause problems such as echo or low sound.

SUMMARY

The present disclosure provides a protective case for a mobile terminal to solve a technical problem that a conventional protective case has a microphone waterproof function is likely to cause problems such as echo or low sound.

The present disclosure provides the protective case for the mobile terminal. The protective case comprises a lower shell, an upper cover detachably connected to the lower shell, and a waterproof plug.

The upper cover and the lower shell are enclosed to form an accommodating cavity. The accommodating cavity is configured to accommodate the mobile terminal. A microphone through hole and a groove are defined on a sidewall of the upper cover. The microphone through hole and the groove are spaced apart. The microphone through hole is communicated with the accommodating cavity.

The waterproof plug is rotatably connected to the upper cover. The waterproof plug is assembled in the microphone through hole or the groove by rotating the waterproof plug, and the waterproof plug is separated from the microphone through hole or the groove by rotating the waterproof plug.

When the waterproof plug is rotated to a first state, the waterproof plug is assembled in the microphone through hole to seal the microphone through hole. When the waterproof plug is rotated to a second state, the waterproof plug is assembled in the groove.

In the protective case for the mobile terminal of the present disclosure, when the mobile terminal is in a non-call state, the waterproof plug is rotated to the first state, so that the waterproof plug is assembled in the microphone through hole to seal the microphone through hole, which makes a microphone waterproof. When the mobile terminal is in a call state, the waterproof plug is rotated to the second state, so that the waterproof plug is assembled in the groove, and the microphone through hole is communicated with outside. Therefore, the microphone of the mobile terminal receives sound through the microphone through hole, avoiding the problems such as echo or low sound.

DETAILED DESCRIPTION

Figure 1:
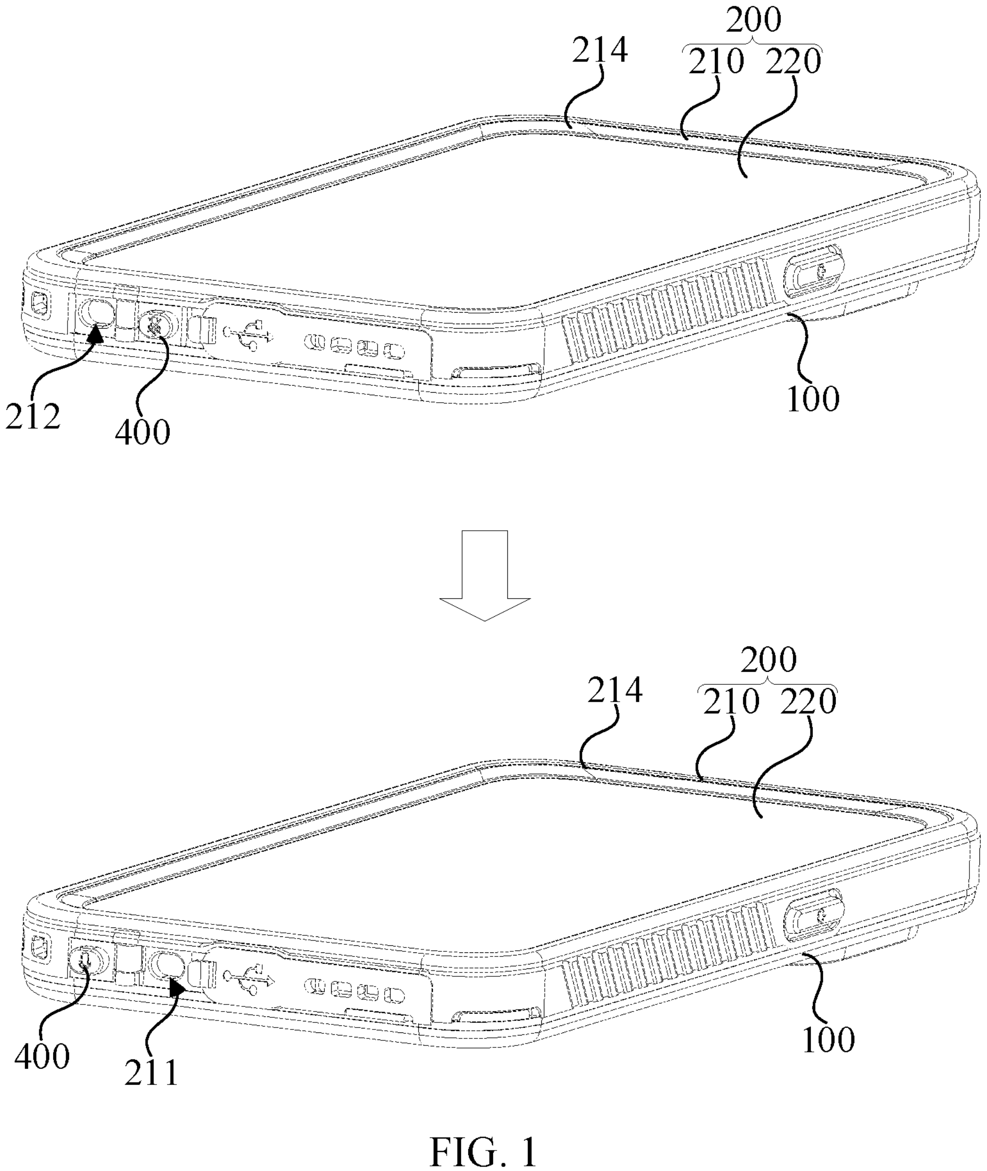
FIG. 1 is a perspective schematic diagram of a protective case for a mobile terminal switching between a first state and a second state according to a first embodiment of the present disclosure.

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

Figure 2:
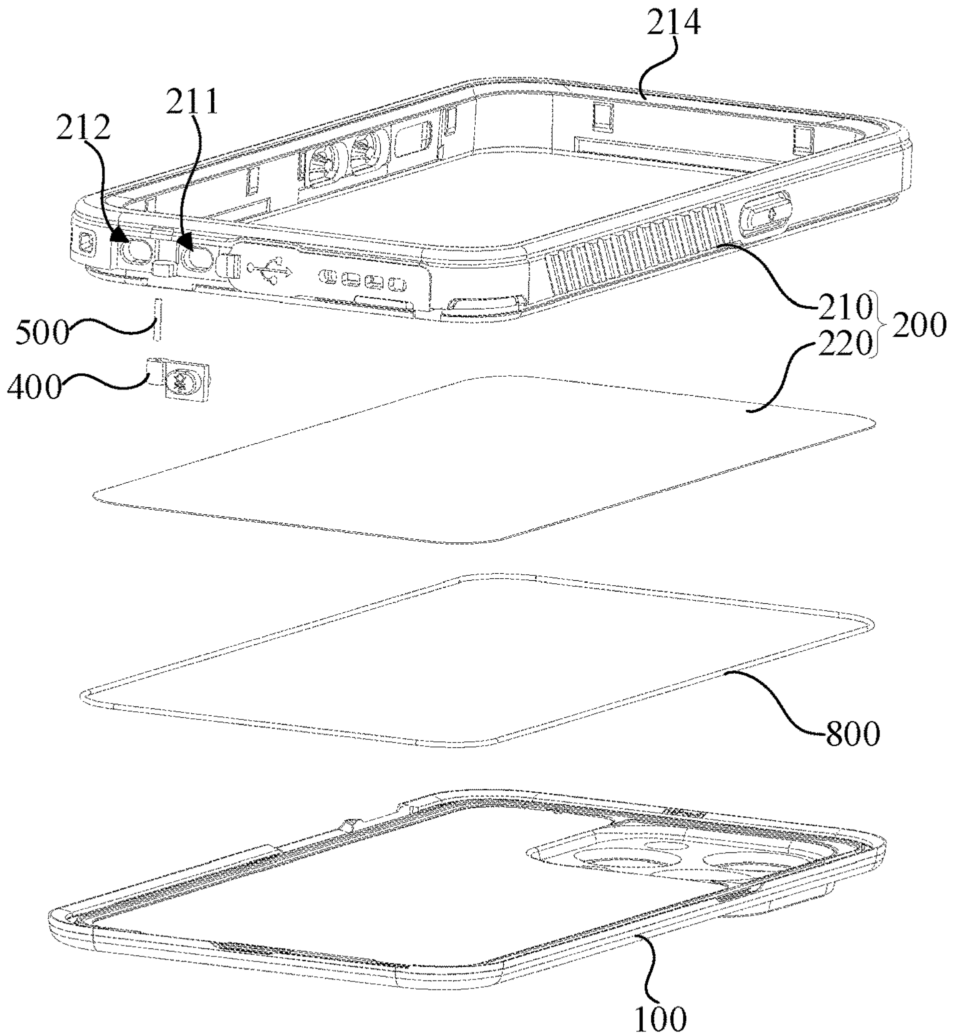
FIG. 2 is an exploded schematic diagram of the protective case for the mobile terminal according to the first embodiment of the present disclosure.

As shown in FIGS. 1 and 2, a first embodiment of the present disclosure provides a protective case for a mobile terminal. The mobile terminal may be, but not limited to, a mobile phone, a tablet computer, and other terminals. The protective case comprises a lower shell 100, an upper cover 200, and a waterproof plug 400.

Figure 3:
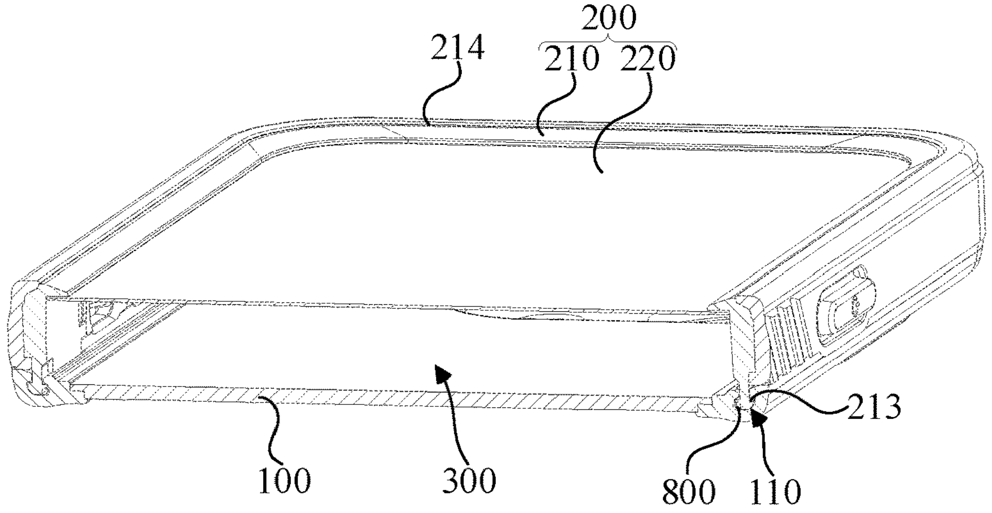
FIG. 3 is a vertical cross-sectional schematic diagram of the protective case for the mobile terminal according to the first embodiment of the present disclosure.

As shown in FIGS. 2 and 3, the an upper cover 200 is detachably connected to the lower shell 100. The upper cover 200 and the lower shell 100 are enclosed to form an accommodating cavity 300. The accommodating cavity 300 is configured to accommodate the mobile terminal. A microphone through hole 211 and a groove 212 are defined on a sidewall of the upper cover 200. The microphone through hole 211 and the groove 212 are spaced apart. The microphone through hole 211 is communicated with the accommodating cavity 300.

Figure 4:
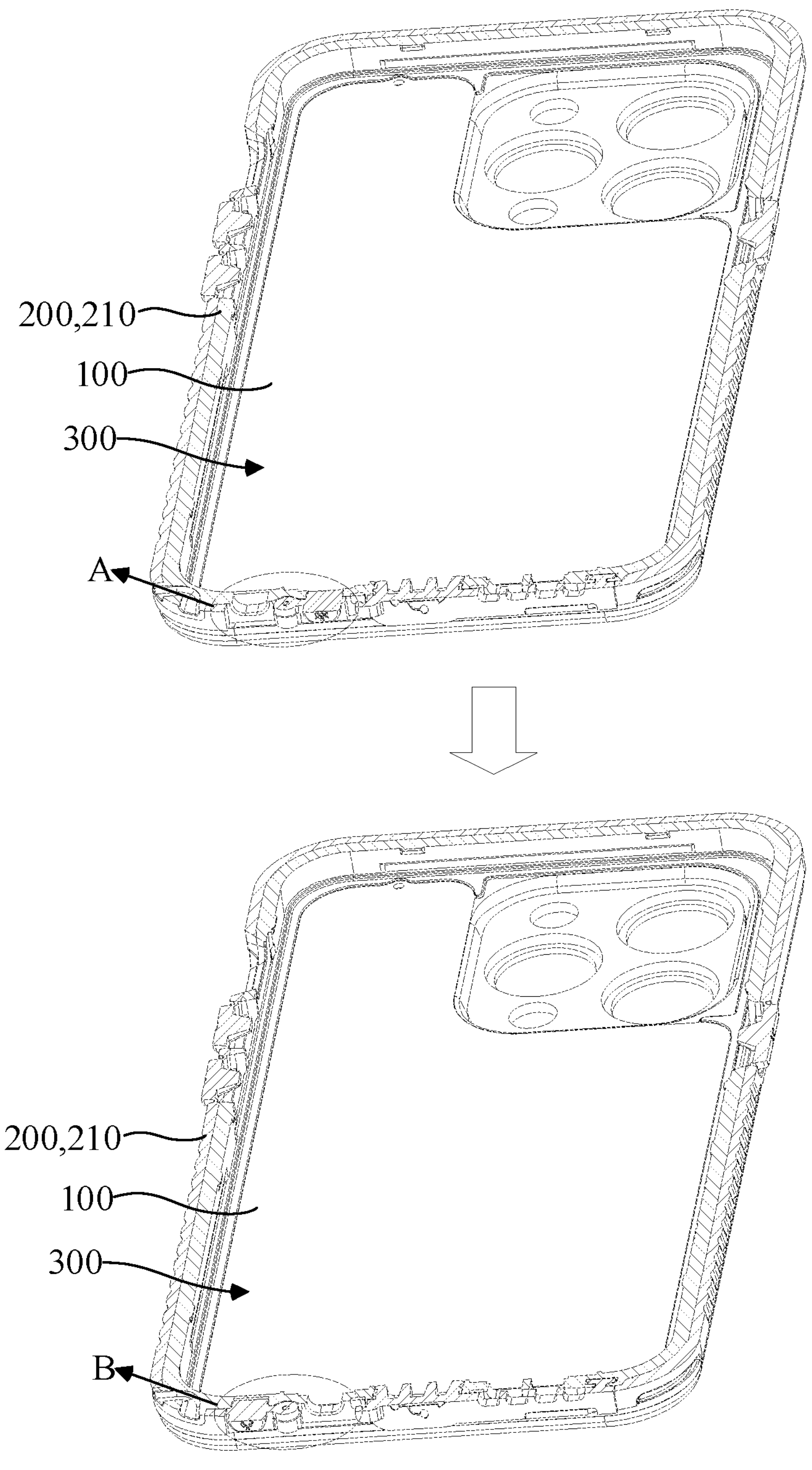
FIG. 4 is a horizontal cross-sectional schematic diagram of the protective case for the mobile terminal switching between the first state and the second state according to the first embodiment of the present disclosure.
Figure 5:
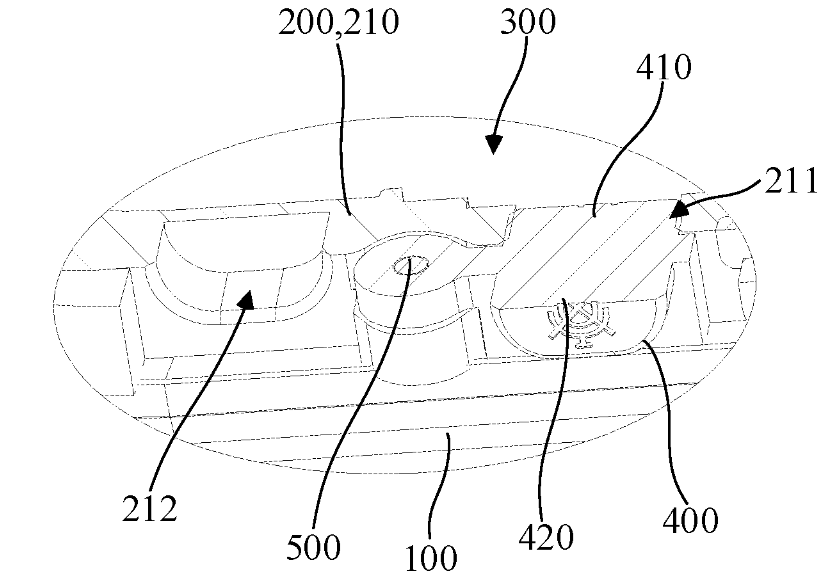
FIG. 5 is an enlarged schematic diagram of area A shown in FIG. 4.
Figure 6:
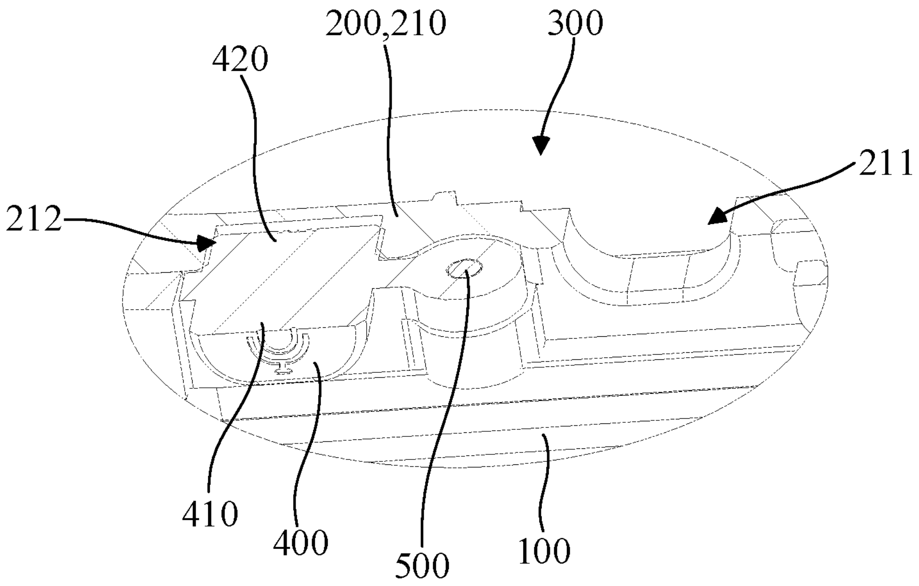
FIG. 6 is an enlarged schematic diagram of area B shown in FIG. 4.

As shown in FIGS. 4-6, the waterproof plug 400 is rotatably connected to the upper cover 200. The waterproof plug 400 is assembled in the microphone through hole 211 or the groove 212 by rotating the waterproof plug, and the waterproof plug 400 is separated from the microphone through hole 212 or the groove 212 by rotating the waterproof plug 400.

In the embodiment, when the mobile terminal is in a non-call state, the waterproof plug 400 is rotated to a first state, so that the waterproof plug 400 is assembled in the microphone through hole 211 to seal the microphone through hole 211, which makes a microphone waterproof. When the mobile terminal is in a call state, the waterproof plug 400 is rotated to a second state, so that the waterproof plug 400 is assembled in the groove 212, and the microphone through hole 211 is communicated with outside. Therefore, the microphone of the mobile terminal receives sound through the microphone through hole 211, avoiding problems such as echo or low sound.

In the first embodiment of the present disclosure, as shown in FIGS. 2 and 4-6, the protective case further comprises a rotating shaft 500. The rotating shaft 500 is arranged between the microphone through hole 211 and the groove 212. The waterproof plug 400 is rotatably connected to the upper cover 200 through the rotating shaft 500.

In the first embodiment of the present disclosure, as shown in FIGS. 4-6, a first boss 410 is arranged on a first side of the waterproof plug 400. A second boss 420 is arranged on a second side of the waterproof plug 400. By such arrangements, in the first state, the first boss 410 is inserted into the microphone through hole 211 to seal the microphone through hole 211. In the second state, the second boss 420 is inserted into the groove 212.

FIGS. 7-11 are schematic diagrams of the protective case for the mobile terminal of a second embodiment of the present disclosure. The only difference between the protective case of the second embodiment of the present application and the protective case of the first embodiment is that a manner in which the waterproof plug 400 is rotatably connected to the upper cover 200 is different.

Figure 7:
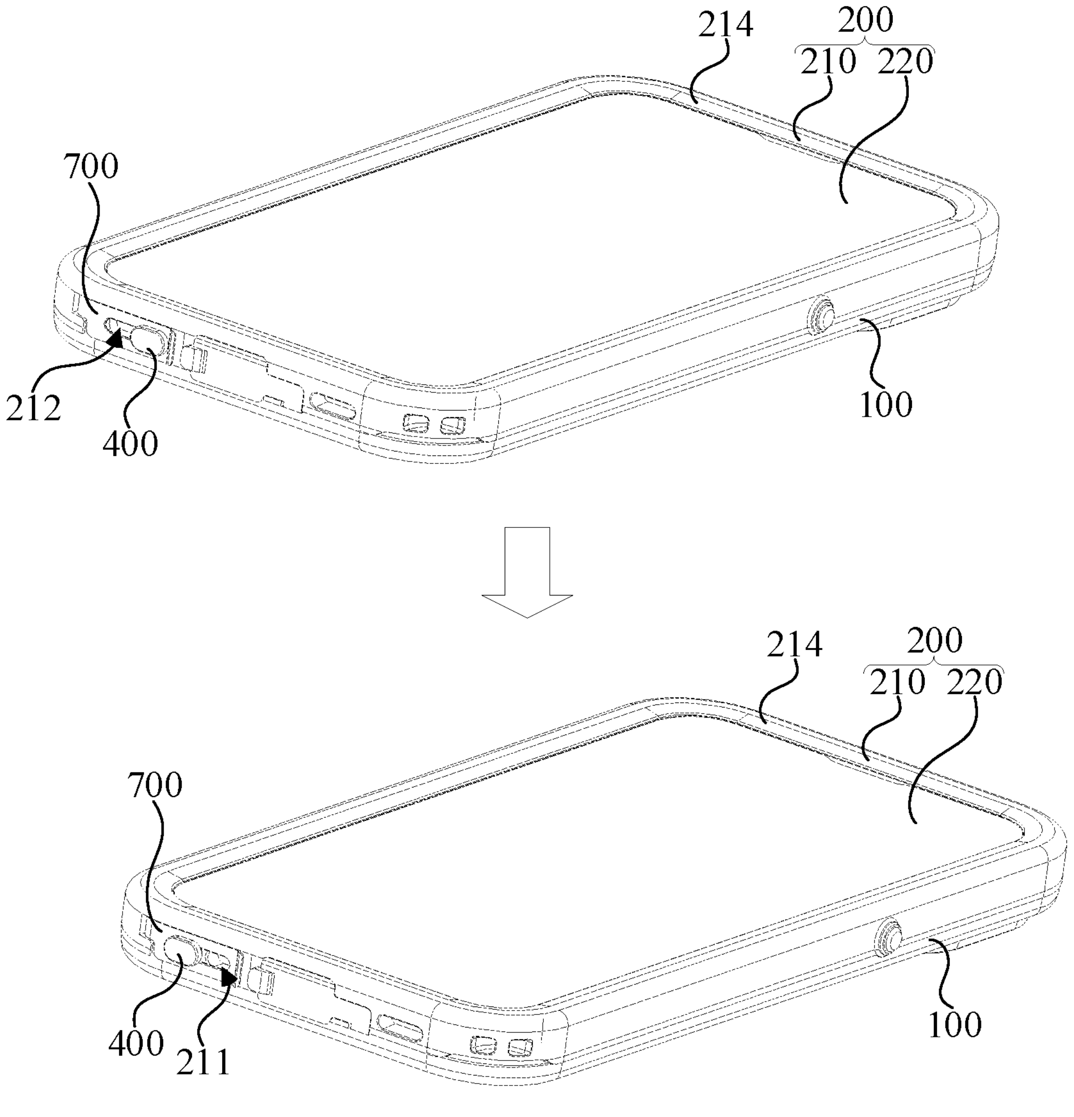
FIG. 7 is a perspective schematic diagram of the protective case for the mobile terminal switching between the first state and the second state according to a second embodiment of the present disclosure.
Figure 8:
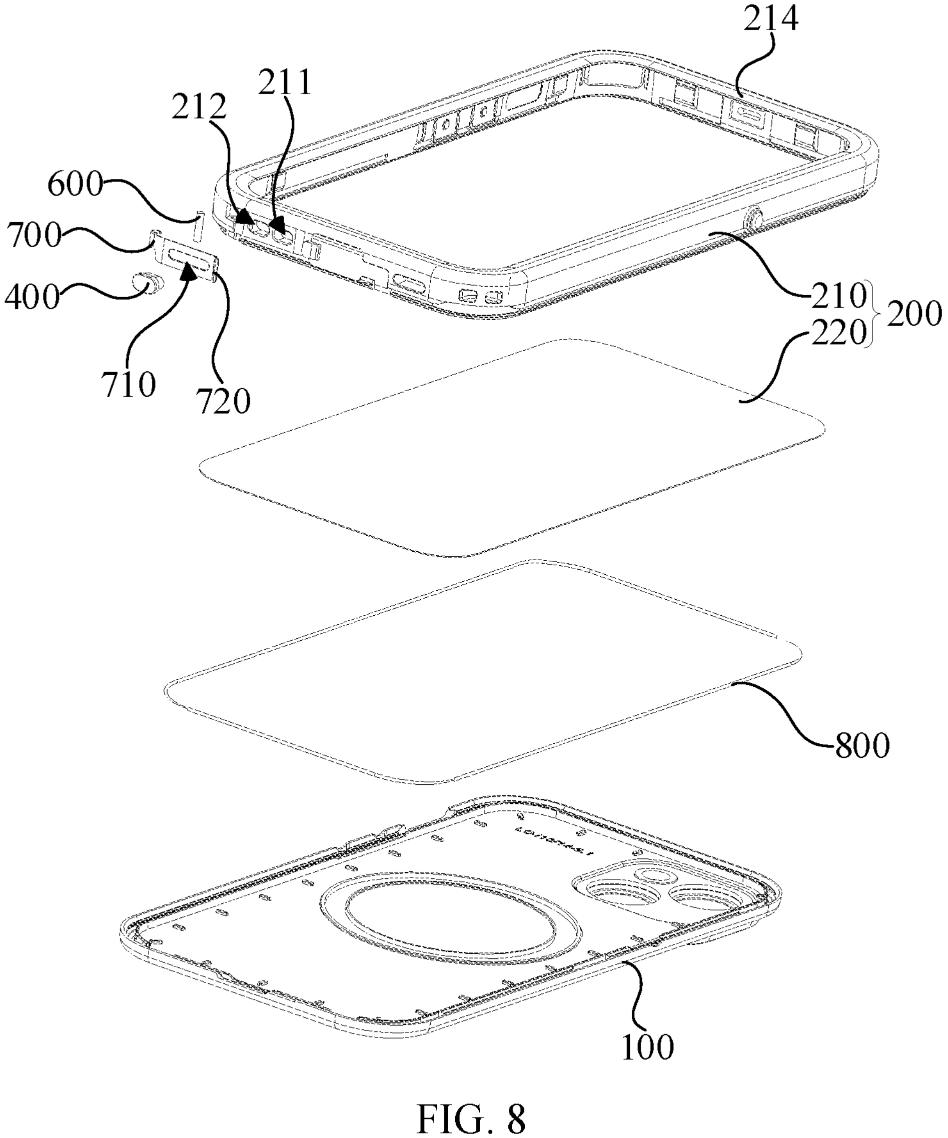
FIG. 8 is an exploded schematic diagram of the protective case for the mobile terminal according to the second embodiment of the present disclosure.

In the second embodiment of the present disclosure, as shown in FIGS. 7-8, the protective case further comprises a plug pin 600 and a connecting piece 700. The microphone through hole 211 and the groove 212 are located on one side of the plug pin 600. A first end of the connecting piece 700 is rotatably connected to the upper cover 200 through the plug pin 600. The waterproof plug 400 is slidably connected to the connecting piece 700, so that the waterproof plug 400 is rotationally connected to the upper cover 200.

Figure 9:
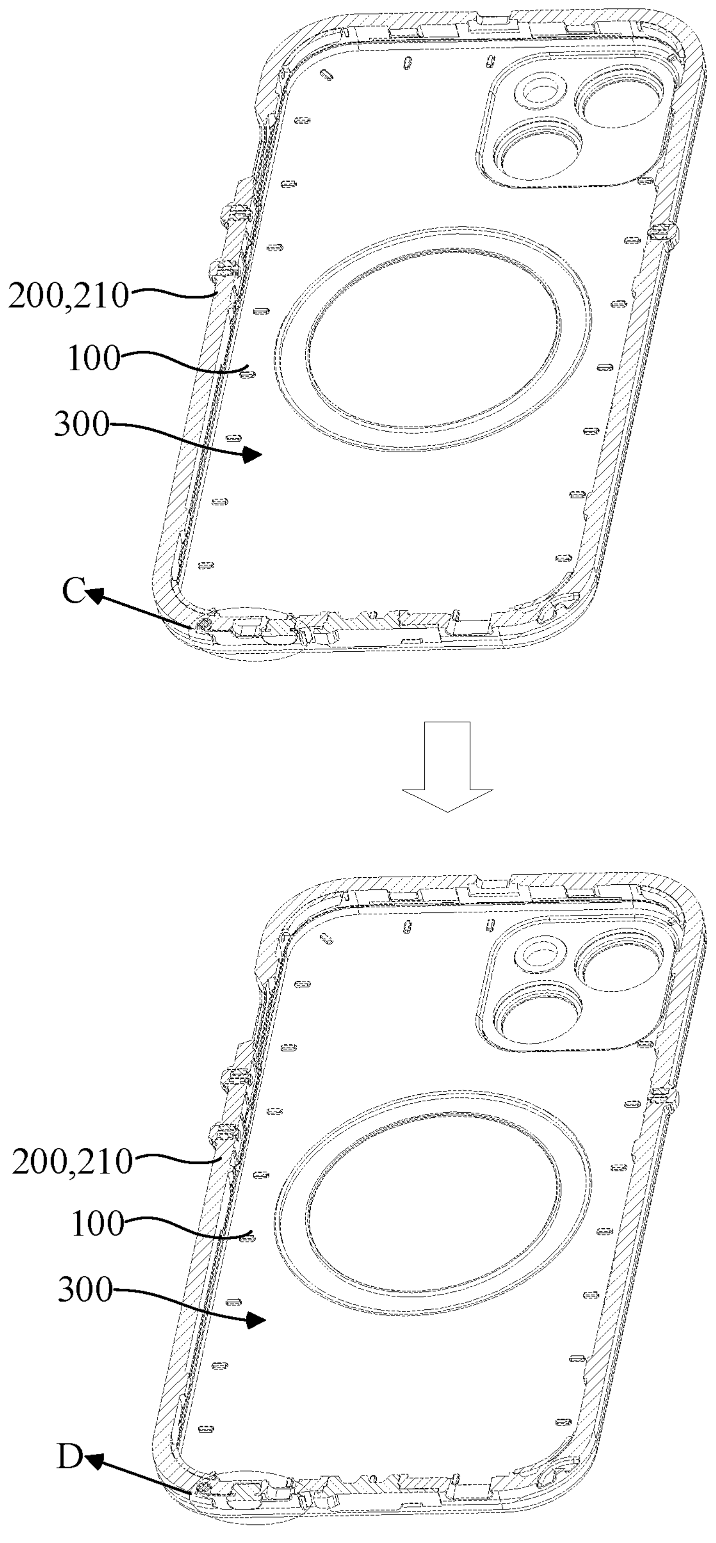
FIG. 9 is a horizontal cross-sectional schematic diagram of the protective case for the mobile terminal switching between the first state and the second state according to the second embodiment of the present disclosure.
Figure 10:
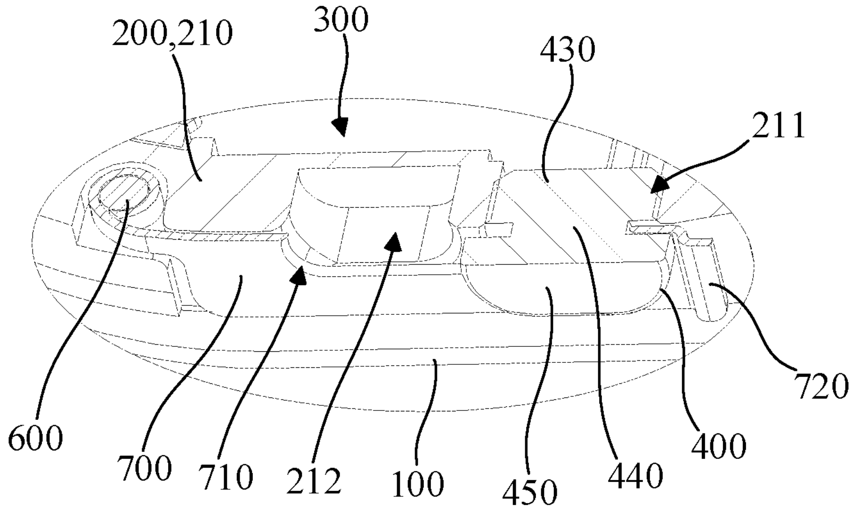
FIG. 10 is an enlarged schematic diagram of area C shown in FIG. 9.
Figure 11:
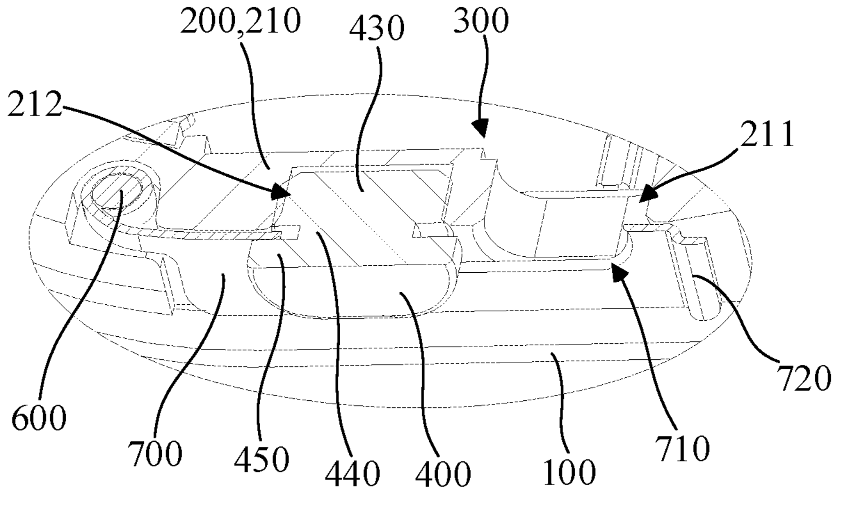
FIG. 11 is an enlarged schematic diagram of area D shown in FIG. 9.

As shown in FIGS. 9-11, the waterproof plug 400 is rotated to be correspondingly to the microphone through hole 211. When the waterproof plug 400 is rotated to the first state, the waterproof plug 400 is assembled in the microphone through hole 211 to seal the microphone through hole 211. The waterproof plug 400 is rotated to be correspondingly to the groove 212. When the waterproof plug 400 is rotated to the second state, the waterproof plug 400 is assembled in the groove 212.

In the second embodiment of the present disclosure, as shown in FIGS. 8, 10, and 11, the connecting piece 700 defines a sliding groove 710. The waterproof plug 400 comprises a third boss 430, a sliding portion 440, and a stop block 450. The third boss 430, the sliding portion 440, and the stop block 450 are connected in sequence. The connecting piece 700 is arranged between the third boss 430 and the stop block 450. An outer diameter of the sliding portion 440 is matched with a width of the sliding groove 710. An outer diameter of the third boss 430 and an outer diameter of the stop block 450 are greater than the outer diameter of the sliding portion 440. The sliding portion 440 is slidably arranged in the sliding groove 710, so that the waterproof plug 400 is slidably connected to the connecting piece 700. By such arrangements, in the first state, the third boss 430 is inserted into the microphone through hole 211 to seal the microphone through hole 211, and in the second state, the third boss 430 is inserted into the groove 212.

In the second embodiment of the present disclosure, as shown in FIGS. 8, 10, and 11, a toggle portion 720 is arranged on a second end of the connecting piece 700. A gap is formed between the toggle portion 720 and the sidewall of the upper cover 200. Thus, by pulling the toggle portion 720, the connecting piece 700 is rotated so that the waterproof plug 400 is separated from the microphone through hole 211 or the groove 212.

In the first embodiment and the second embodiment of the present disclosure, as shown in FIG. 3, a clamping groove 110 is defined on the lower shell 100. The upper cover 200 comprises a limit rib 213 corresponding to the clamping groove 110, and the limit rib 213 is detachably clamped in the clamping groove 110, so that the upper cover 200 is detachably connected to the lower shell 100.

In the first embodiment and the second embodiment of the present disclosure, as shown in FIG. 3, the protective case further comprises a sealing ring 800. The sealing ring 800 is arranged in the clamping groove 110. The limit rib 213 abuts against the sealing ring 800. Thus, the upper cover 200 is sealed with the lower shell 100.

In the first embodiment and the second embodiment of the present disclosure, as shown in FIGS. 2, 3, and 8, the upper cover 200 comprises a frame 210 and a protective film 220. The protective film 220 is sleeved in the frame 210. The frame 210 is detachably connected to the lower shell 100 through the limit rib 213. The protective film 220 is arranged opposite to the lower shell 100.

The frame 210, the protective film 220, and the lower shell 100 are enclosed to define the accommodating cavity 300. The microphone through hole 211 and the groove 212 are defined on a sidewall of the frame 210.

In the first embodiment and the second embodiment of the present disclosure, as shown in FIG. 3, the frame 210 comprises a step 214 extending inwards in a radial direction. The step 214 is configured to abut against one side of the protective film 220 away from the lower shell 100.

In the specification and claims of the present disclosure, terms “include/comprise” and terms “have/contain” and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A protective case for a mobile terminal, comprising:

a lower housing;

an upper cover detachably connected to the lower housing; and a waterproof plug;

wherein the upper cover and the lower housing are fitted together to define an accommodating cavity configured to accommodate the mobile terminal;

wherein there are defined a microphone through hole and a groove in a sidewall of the upper cover;

wherein the microphone through hole and the groove are spaced apart from each other; wherein the microphone through hole is in communication with the accommodating cavity, and wherein the groove is a groove that is not in communication with the accommodating cavity;

wherein the waterproof plug is rotatably connected to the upper cover; wherein the waterproof plug is operative to be rotated to be fitted inside the microphone through hole or fitted inside the groove, and wherein the waterproof plug is operative to be rotated to be detached from the microphone through hole or the groove;

wherein the waterproof plug comprises a first state and a second state and is operative to switch back and forth between the first state and the second state, wherein in the first state the waterproof plug is fitted inside the microphone through hole and is not fitted inside the groove to seal the microphone through hole for microphone waterproofing, and wherein in the second state the waterproof plug is fitted inside the groove and is not fitted inside the microphone through hole such that the microphone through hole is open for sound reception;

wherein when the waterproof plug is rotated from the second state to the first state, the waterproof plug is detached from the groove and fitted in the microphone through hole to seal the microphone through hole, and when the waterproof plug is rotated from the first state to the second state, the waterproof plug is detached from the microphone through hole and fitted inside the groove;

wherein the protective case further comprising a rotating shaft arranged between the microphone through hole and the groove, the waterproof plug being rotatably connected to the upper cover through the rotating shaft;

wherein the waterproof plug comprises a first boss disposed on a first side thereof, and a second boss disposed on a second side thereof, the first side and the second side being opposite sides of the waterproof plug;

wherein the first state of the waterproof plug, the second boss is detached from the groove and the first boss is inserted into the microphone through hole to seal the microphone through hole;

wherein the second state of the waterproof plug, the first boss is detached from the microphone through hole and the second boss is inserted into the groove;

wherein the waterproof plug comprises a connecting portion and a main body portion that are integrally formed, wherein the connecting portion defines a shaft hole therein, and the waterproof plug is rotatably connected to the rotating shaft through the shaft hole, wherein the first boss and the second boss are respectively disposed on opposite sides of the main body portion, and the first boss and the second boss are aligned with each other in position;

wherein the main body portion is a substantially rectangular or square shaped flat plate, and each of the first boss and the second boss is a cylinder or an elliptical cylinder having a circular or elliptical bottom surface; and wherein a microphone symbol with a slash mark is printed on an outer bottom surface of the second boss, and a microphone symbol is printed on an outer bottom surface of the first boss, such that when the waterproof plug is in the first state with the first boss inserted into the microphone through hole and the second boss exposed, the microphone symbol with the slash mark on the second boss indicates that the microphone through hole is sealed, and when the waterproof plug is in the second state with the second boss inserted into the groove and the first boss exposed, the microphone symbol on the first boss indicates that the microphone through hole is open.

2. The protective case according to claim 1, wherein a clamping groove is defined on the lower housing; the upper cover comprises a limit rib corresponding to the clamping groove, and the limit rib is detachably clamped in the clamping groove, so that the upper cover is detachably connected to the lower housing.

3. The protective case according to claim 2, wherein the protective case further comprises a sealing ring; the sealing ring is arranged in the clamping groove; the limit rib abuts against the sealing ring.

4. The protective case according to claim 1, wherein the upper cover comprises a frame and a protective film; the protective film is sleeved in the frame; the frame is detachably connected to the lower housing; the protective film is arranged opposite to the lower housing;

wherein the frame, the protective film, and the lower housing are enclosed to define the accommodating cavity; the microphone through hole and the groove are defined on a sidewall of the frame.

5. The protective case according to claim 4, wherein the frame comprises a step extending inwards in a radial direction; the step is configured to abut against one side of the protective film away from the lower housing.

6. The protective case according to claim 1, wherein the microphone through hole and the groove are disposed on a same sidewall of the upper cover and are disposed adjacent to each other, and wherein when the waterproof plug is switched back and forth between the first state and the second state, the waterproof plug is rotated substantially 180 degrees.

7. The protective case according to claim 1, wherein the first state corresponds to a non-call state of the mobile terminal, in which the waterproof plug seals the microphone through hole for microphone waterproofing; and wherein the second state corresponds to a call state of the mobile terminal, in which the waterproof plug is fitted inside the groove and the microphone through hole is open and in direct communication with outside for sound reception by a microphone of the mobile terminal during a call.

* * * * *